(12) United States Patent
Minami

(10) Patent No.: US 6,554,034 B1
(45) Date of Patent: Apr. 29, 2003

(54) STUDLESS TIRE INCLUDING RIB PROVIDED WITH FIRST AND SECOND SIPES

(75) Inventor: Nobuaki Minami, Kobe (JP)

(73) Assignee: Sumitomo Rubber Industries, Ltd., Hyogo-ken (JP)

( * ) Notice: Subject to any disclaimer, the term of this patent is extended or adjusted under 35 U.S.C. 154(b) by 25 days.

(21) Appl. No.: 09/680,430

(22) Filed: Oct. 6, 2000

(30) Foreign Application Priority Data

Oct. 6, 1999 (JP) .......................................... 11-286008
Dec. 7, 1999 (JP) .......................................... 11-348062

(51) Int. Cl.$^7$ ........................ B60C 11/12; B60C 105/00
(52) U.S. Cl. ............................. 152/209.22; 152/DIG. 3
(58) Field of Search ....................... 152/209.18, 209.22, 152/DIG. 3

(56) References Cited

U.S. PATENT DOCUMENTS

| | | | |
|---|---|---|---|
| 2,272,879 A | * | 2/1942 | Hargraves |
| 2,302,027 A | * | 11/1942 | Havens |
| 5,785,780 A | * | 7/1998 | Ochi |
| 5,814,169 A | | 9/1998 | Yamaguchi et al. |
| 5,873,399 A | * | 2/1999 | Ochi et al. |

FOREIGN PATENT DOCUMENTS

| | | | |
|---|---|---|---|
| EP | 0882 606 A | | 12/1998 |
| JP | 3-92403 | * | 4/1991 |
| JP | 11-245631 | * | 9/1991 |
| JP | 6-32115 A | | 2/1994 |
| JP | 10-35226 | * | 2/1998 |

* cited by examiner

*Primary Examiner*—Steven D. Maki
(74) *Attorney, Agent, or Firm*—Birch, Stewart, Kolasch & Birch, LLP

(57) ABSTRACT

A studless tire comprises a tread provided with a plurality of blocks and at least one rib provided with first sipes and second sipes each extending across the rib. The first sipes and second sipes are alternately arranged in the longitudinal direction of the rib at circumferential pitches Pc in a range of from 0.028 to 0.04 times a ground contacting width of the tread. Each of the first sipes and second sipes comprises a deep central part, a shallow part on one side thereof and a mid-depth part on the other side thereof, wherein the deep central part has a depth in a range of from 0.70 to 0.80 times a depth of a main longitudinal groove defining the rib, the mid-depth part has a depth being in a range of from 0.40 to 0.60 times the depth of the main longitudinal groove, and the shallow part has a depth in a range of from 0.04 to 0.35 times the depth of the main longitudinal groove. The shallow part and mid-depth part of each first sipe are positionally reverse to those of the second sipes so that, on each side of the rib, the shallow parts alternate with the mid-depth parts.

15 Claims, 7 Drawing Sheets

STUDLESS TIRE INCLUDING RIB PROVIDED WITH FIRST AND SECOND SIPES

The present invention relates to a studless tire, more particularly to a tread structure capable of improving uneven wear resistance.

In general, studless tires are provided in the tread portion with blocks and a large number of sipes to improve snow performance and ice performance.

In case of a studless tire provided with circumferential ribs in addition to blocks as shown in FIGS. 6A and 7A, edges of the blocks which edges are adjacent to the ribs with sipes (s) sometimes wear unevenly as shown in FIGS. 6B and 7B as hatched part.

It is therefore, an object of the present invention to provide a studless tire in which the above-mentioned uneven wear can be effectively controlled without sacrificing ice performance, snow performance and the like.

According to one aspect of the present invention, a studless tire comprises a tread provided with blocks and at least one rib provided with sipes each extending across the overall width of the rib, the sipes comprising first sipes and second sipes alternately arranged in the longitudinal direction of the rib at circumferential pitches in a range of from 0.028 to 0.04 times a ground contacting width of the tread, each of the first sipes and second sipes comprising a deep central part, a shallow part on one side thereof and a mid-depth part on the other side thereof, the deep central part having a depth in a range of from 0.70 to 0.80 times a depth of a main longitudinal groove defining the rib, the mid-depth part having a depth being in a range of from 0.40 to 0.60 times the depth of the main longitudinal groove, and the shallow part having a depth in a range of from 0.04 to 0.35 times the depth of the main longitudinal groove, the shallow part and mid-depth part of each first sipe being positionally reverse to those of the second sipes so that, on each side of the rib, the shallow parts alternate with the mid-depth parts.

Therefore, even if the sipes are arranged at small pitches, circumferential and axial deformation of the rib during running is controlled. As a result, uneven wear of the adjacent blocks' edges can be effectively reduced while receiving improved edge effect from the sipes.

Here, the "sipe" means a narrow slit or cut having a width of less than 1.5 mm. The ground contacting width means the width between the tread edges or axial outermost edges of the ground contacting region under such a condition that the tire is mounted on its standard rim and inflated to its standard pressure, and then loaded with a standard load. The standard wheel rim is a wheel rim officially approved for the tire by standardization association, organization and the like, such as JATMA (Japan and Asia), T&RA (North America), ETRTO (Europe), STRO (Scandinavia) and the like. The standard pressure is the "maximum air pressure" in JATMA, the "Inflation Pressure" in ETRTO, the maximum pressure given in the "Tire Load Limits at Various Cold Inflation Pressures" table in T&RA or the like. In case of passenger car tires, however, 180 kPa is used as the standard pressure. The standard load is the "maximum load capacity" in JATMA, the "Load Capacity" in ETRTO, the maximum value given in the above-mentioned table in T&RA or the like.

Embodiments of the present invention will now be described in detain in conjunction with the accompanying drawings.

Figure 1:
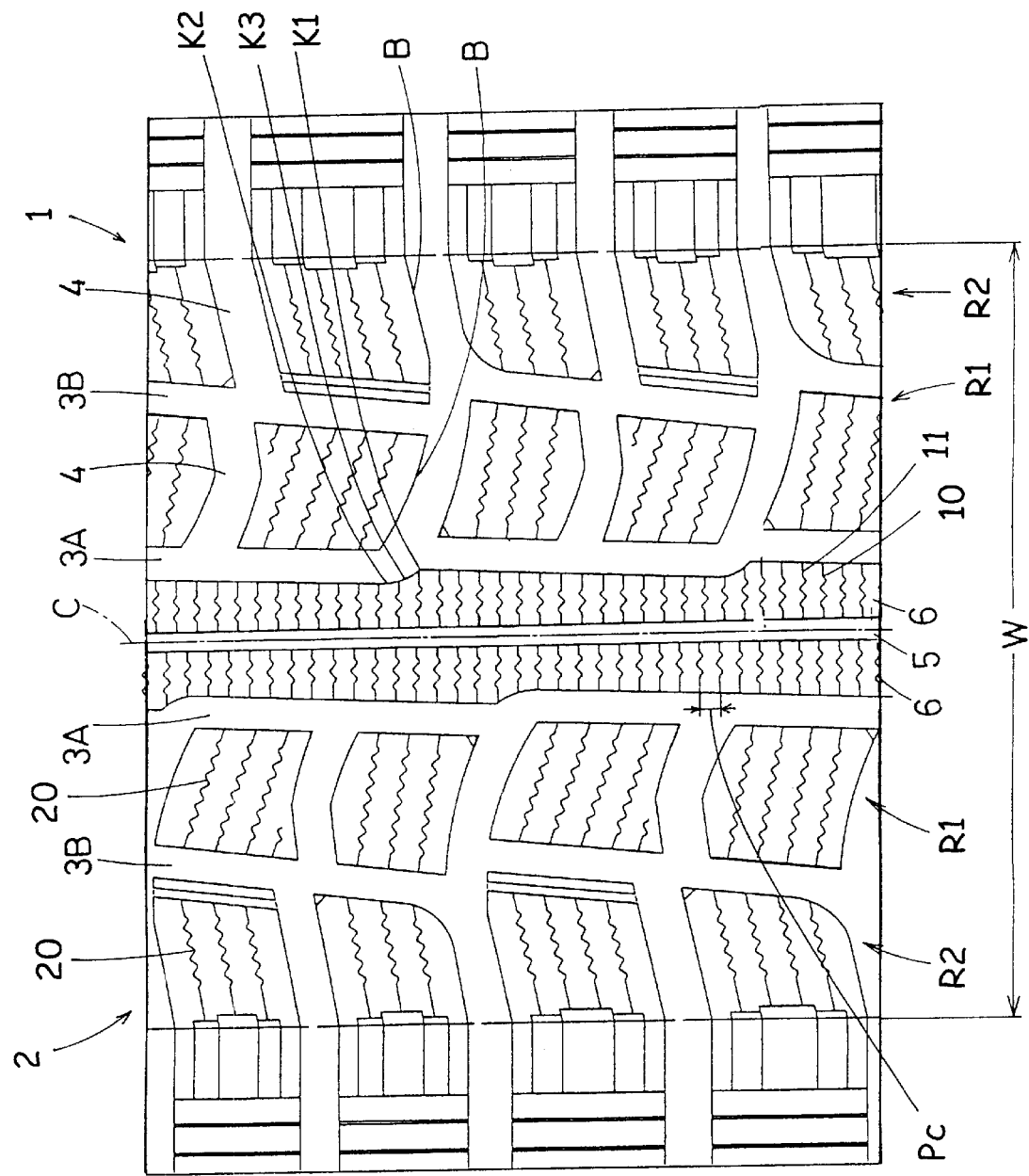
FIG. 1 is a developed plan view of a tire according to the present invention showing an example of the tread pattern.

In the drawings, studless tire 1 according to the present invention comprises a tread portion 2. The tread portion 2 is provided on each side of the tire equator C with blocks B circumferentially divided by main lateral grooves 4 and a rib 6 provided with first sipes 10 and second sipes 11.

Figure 3:
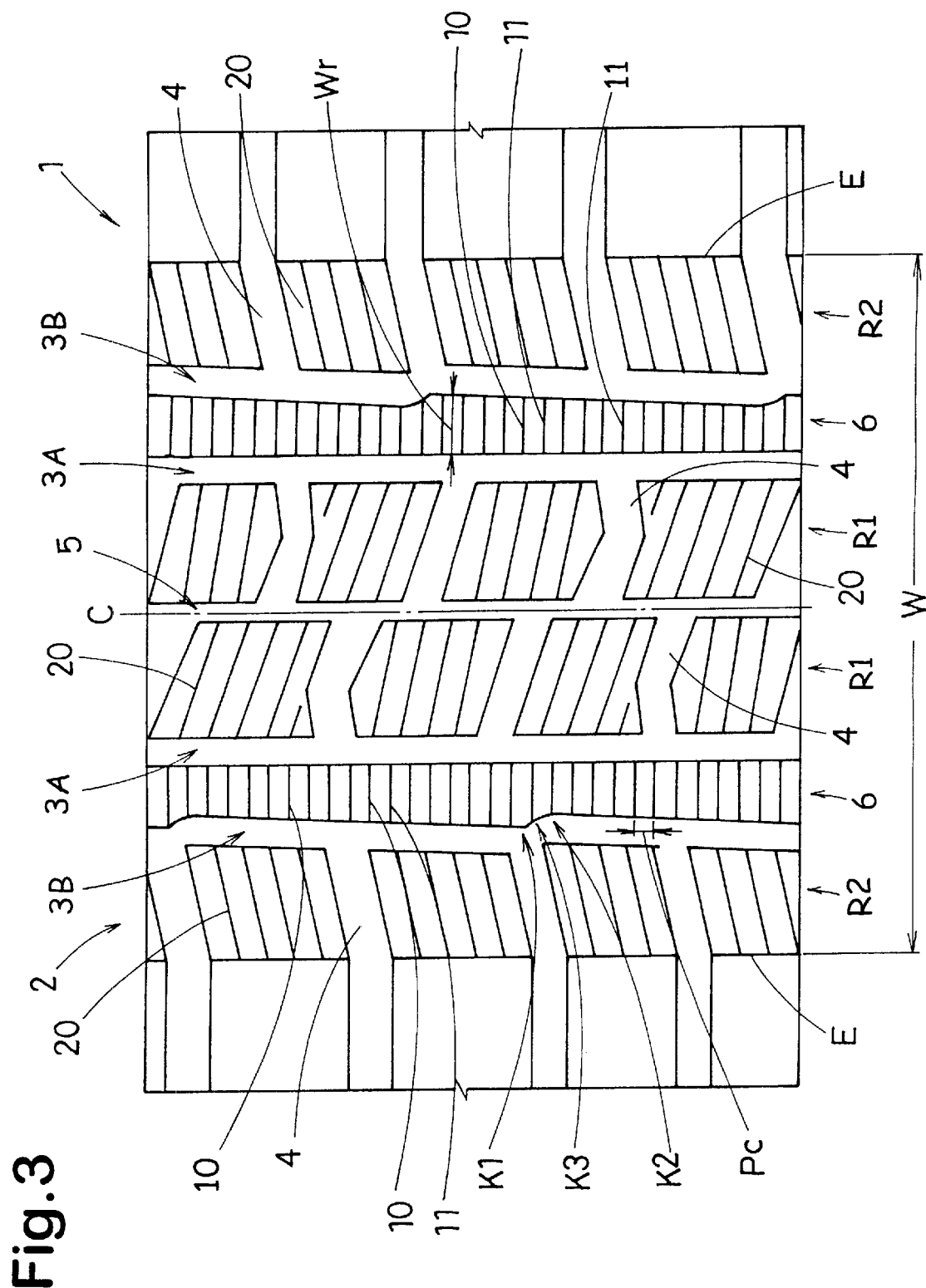
FIG. 3 is a developed plan view of a tire according to the present invention showing another example of the tread pattern.

In both the embodiments shown in FIGS. 1 and 3, two rows of blocks B are disposed on each side of the tire equator C. In FIG. 1, the two rows of blocks B are disposed axially outside the rib 6, but in FIG. 3, the rib 6 is disposed between the two rows R1 and R2 of blocks B. The tread portion is therefor, provided with five longitudinal grooves extend continuously in the tire circumferential direction. The five longitudinal grooves are a central longitudinal groove 5 which is disposed on the tire equator C, and an axially inner main longitudinal groove 3A and an axially outer main longitudinal groove 3B which are disposed on each side of the tire equator C. In FIGS. 1 and 3, the tread patterns shown are bidirectional, but it is also possible to provide the tread portion 2 with a unidirectional pattern.

As to the widths WG and depths D of the main longitudinal grooves 3 and main lateral grooves 4, it is preferable, in case of passenger car tires, that the widths WG are in a range of from 5 to 25 mm, and the depths D are in a range of from 8 to 15 mm. The width Wg of the central longitudinal groove 5 is less than the width WG, but the depth Dg of the central longitudinal groove 5 is the substantially same as the depth D. The main lateral grooves 4 are the substantially same depth as the main longitudinal grooves 3, which are about 12 mm in this example.

The first and second sipes 10 and 11 extend across the overall width of the rib 6, and therefore, both ends of each sipe are opened to the adjacent longitudinal grooves.

Embodiment Shown in FIG. 1

In the embodiment shown in FIG. 1, the main lateral grooves 4 extend from the inner main longitudinal grooves 3A to the tread edges E.

The above-mentioned ribs 6 are defined between the central longitudinal groove 5 and the axially inner main longitudinal grooves 3A. Thus, the ribs 6 are disposed adjacently to the central longitudinal groove 5. The two rows R1 and R2 of blocks B are disposed on the axially outside of each rib 6.

The central narrow longitudinal groove 5 is a straight groove. Therefore, the axially inner edge of each rib 6 is straight. But, the axially outer edge is zigzag made up of long segments and very short segments, whereby the axial width Wr of the rib 6 varies cyclically along the length thereof. At each of maximum axial width points K1, a short segment intersects a long segment at an obtuse angle. But, at each of minimum axial width points K2, the short segment merges into a long segment through a curved portion K3. One zigzag cycle corresponds to two blocks of the adjacent block row.

Because of the above-mentioned very short segments, in the most part of the rib, the width of the rib always increases towards a circumferential direction. This promotes opening of the sipes 10 and 11 and improves ice performance.

As the central longitudinal groove 5 is relatively narrow, if the axially inner edge is formed as zigzag, packed snow and mud are liable to be retained in the narrow longitudinal groove 5, and as a result on-the-snow running performance deteriorates.

In this embodiment shown in FIG. 1, each of the sipes 10 and 11 has both end portions which are parallel to the axial direction, but a middle portion therebetween is zigzagged. For the middle portion, various zigzag configurations, such as saw-tooth wave, rectangular wave, sine wave and the like can be used. Although, the sipes are partially zigzagged, it is preferable that the sipes generally extend in the tire axial direction.

According to the present invention, the first sipes 10 and second sipes 11 are arranged alternately along the longitudinal direction of the rib 6 at circumferential pitches Pc of from 0.028 to 0.04 times the ground contacting width W.

Each of the first sipes 10 is made up of a shallow part 10C, a mid-depth part 10B and a deep part 10A therebetween. Each of the second sipes 11 is made up of a shallow part 11C, a mid-depth part 11B and a deep part 11A therebetween. The mid-depth part 10B and shallow part 11C are positioned on the axially inside of the deep parts 10A and 11A, respectively. The shallow part 10C and mid-depth part 11B are positioned on the axially outside of the deep parts 10A and 11A, respectively.

As to the depths of the first and second sipes 10 and 11, each deep part 10A, 11A has a depth Ds3 in the range of from 0.70 to 0.80 times the depth D of the main longitudinal groove 3, and each mid-depth part 10B, 11B has a depth Ds2 in the range of from 0.40 to 0.60 times the depth D, and each shallow part 10C, 11C has a depth Ds1 in the range of from 0.04 to 0.35 times the depth D. In each of the deep, mid-depth and shallow parts, the depth is substantially constant. If the main longitudinal grooves 3 have different depths, the depth D of the main longitudinal groove which is axially outwardly adjacent to the rib is used in defining the depths Ds1, Ds2 and Ds3. Further, if the depth D of the main longitudinal groove is varied in its longitudinal direction, then its average depth is used.

Incidentally, at the bottom of the sipe, corners 15 are rounded to prevent stress concentration.

As to the lengths of the deep, mid-depth and shallow parts, the axial lengths L3 of the deep parts 10A and 11A are in the range of from 0.40 to 0.90 times the axial lengths L of the sipes 10 and 11, respectively, and the axial lengths L2 of the mid-depth parts 10B and 11B are in the range of from 0.05 to 0.30 times the axial lengths L of the sipes 10 and 11, respectively, and the axial lengths L1 of the shallow parts 10C and 11C are in the range of from 0.05 to 0.30 times the axial lengths L of the sipes 10 and 11, respectively.

In this embodiment, the deep part 10A, 11A corresponding to the above-mentioned zigzagged middle portion. Accordingly, the mid-depth and shallow parts 10B, 11B, 10C and 11C are parallel to the axial direction.

The width Wr of each of the ribs 6 is set in the range of from 0.07 to 0.30 times the ground contacting width W, and the space between the ribs 6 which is equal to the width Wg of the central narrow longitudinal groove 5 is set in the range of from 0.02 to 0.06 times the ground contacting width W, whereby snow performance can be improved in addition to the ice performance and uneven wear resistance.

The depth Dg of the central narrow longitudinal groove 5 is set in the range of not less than the depth Ds3 of the sipe but not more than the depth D of the main longitudinal grooves 3.

If $\{Ds3>0.80\times D\}$ or $\{Ds2>0.60\times D\}$ or $\{Ds1>0.35\times D\}$, then the rigidity of the rib 6 becomes insufficient, and the adjacent blocks B are liable to wear unevenly. {If $Ds3<0.70\times D\}$ or $\{Ds2<0.40\times D\}$ or $\{Ds1<0.04\times D\}$, then edge effect becomes insufficient, and it is difficult to improve ice performance.

If $\{L3>0.90\times L\}$ or $\{L2<0.05\times L\}$ or $\{L1<0.05\times L\}$, then uneven wear resistance is liable to decrease. If $\{L3<0.40\times L\}$ or $\{L2>0.30\times L\}$ or $\{L1>0.30\times L\}$, it becomes difficult to improve ice performance.

If $\{Pc<0.028\times W\}$, then it is difficult to prevent the rigidity of the rib from decreasing and thus uneven wear is liable to occur. If $\{Pc>0.04\times W\}$, then edge effect becomes insufficient, and it is difficult to improve ice performance.

If $\{Wr<0.07\times W\}$, then it becomes difficult to improve ice performance. Further, as the rigidity of the rib 6 becomes insufficient, uneven wear resistance decreases. If $\{Wr>0.3\times W\}$, then snow performance such as snow grip has a tendency to decrease.

The above-mentioned blocks B are each provided with sipes 20 whose middle part is zigzagged. In this example, each of the sipes 20 has a constant depth. But it is possible to change the depths in the same manner as the first and second sipes 10, 11.

Embodiment Shown in FIG. 3

In the embodiment shown in FIG. 3, the ribs 6 are defined between the inner main longitudinal grooves 3A and axially outer main longitudinal grooves 3B. The main lateral grooves 4 extend between the narrow central longitudinal groove 5 and the axially inner main longitudinal grooves 3A and between the axially outer main longitudinal grooves 3B and the tread edges E. Thus, each rib 6 is disposed between the two rows R1 and R2 of blocks B.

The central narrow longitudinal groove 5 and axially inner main longitudinal grooves 3A are straight. Thus, similar to the above-mentioned embodiment and for the same reason, the axially inner edge of each of the ribs 6 is straight. But, the axially outer edge is zigzag made up of long segments and very short segments. At the maximum axial width point K1, a short segment intersects a long segment at an obtuse angle. But, around the minimum axial width point K2, the short segment merges into a long segment through a curved portion K3.

Figure 4A:
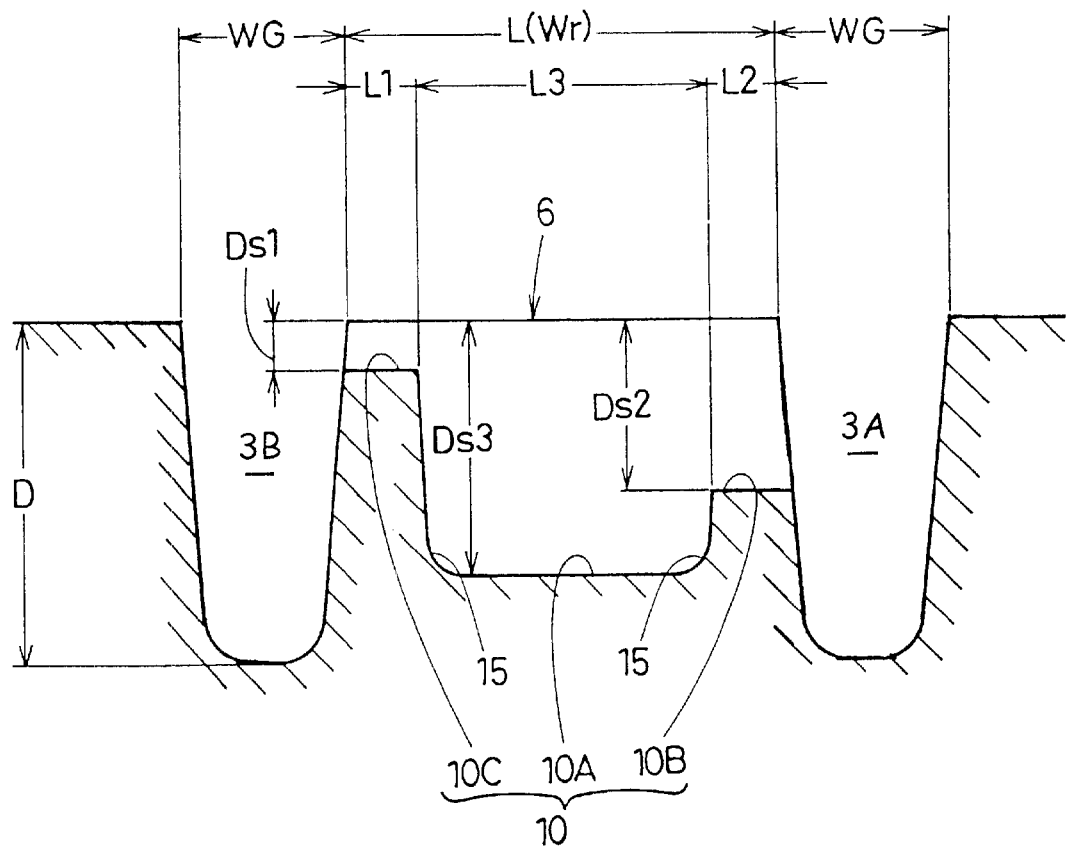
FIGS. 4A and 4B are enlarged cross sectional views taken along a first sipe and a second sipe, respectively.
Figure 4B:
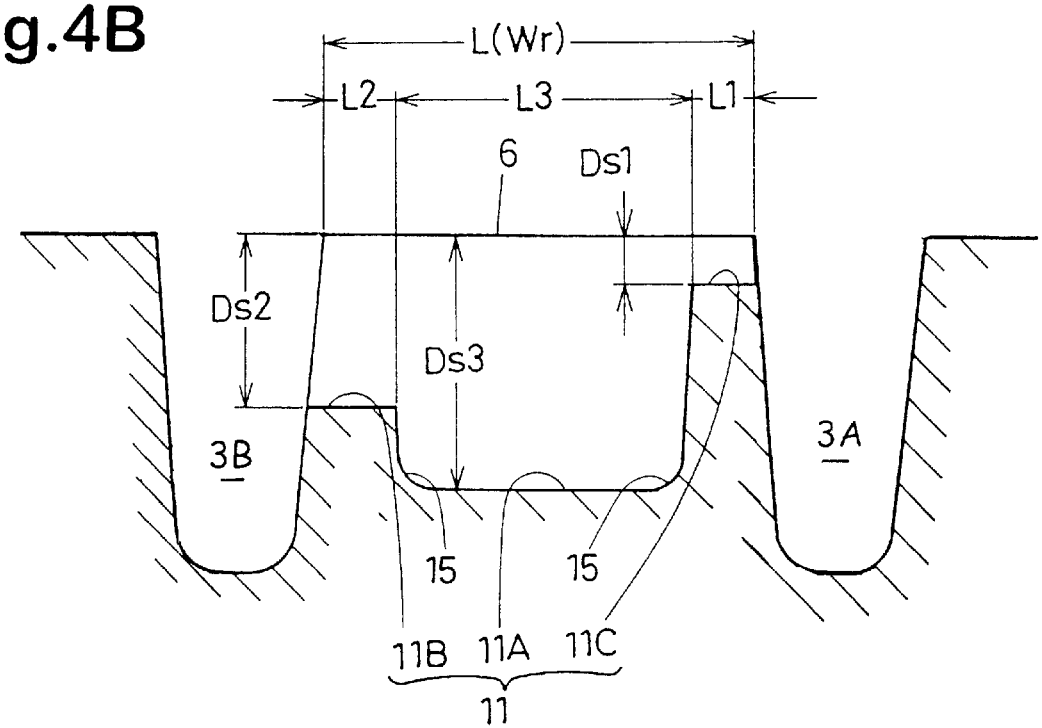

In this embodiment, the first and second sipes 10 and 11 are straight and parallel to the tire axial direction. It is however, possible to incline the sipes at a small angle of less than 30 degrees respect to the axial direction. Further, the zigzag configuration as explained in the former embodiment can be used. In this embodiment, also, the first sipes 10 and second sipes 11 in each rib are alternately arranged. Thus, as shown in FIGS. 4A and 4B, the mid-depth part 10B and shallow part 11C are positioned on the axially inner main longitudinal groove 3A side of the deep parts 10A and 11A, respectively. The shallow part 10C and mid-depth part 11B are positioned on the axially outer main longitudinal groove 3B side of the deep parts 10A and 11A, respectively.

The width Wr of each of the ribs 6 is set in the range of from 0.07 to 0.30 times, preferably 0.08 to 0.15 times the ground contacting width W.

The limitations to the first and second sipes 10 and 11 explained in the former embodiment such as depths Ds1, Ds2 and Ds3, and lengths L, L1, L2 and L3, pitches Pc are also applied in this embodiment.

The blocks B in this embodiment are each provided with sipes 20 which are straight and have a constant depth. But the zigzag sipes 20 can be used. Further, the depths may be varied in the same manner as the first and second sipes 10 and 11.

Comparison Tests

Test tires of size 175/80R14 (wheel rim size 14×5J) having specifications given in Table 1 were made and tested for uneven wear resistance, ice performance and snow performance.

Ex.1 and Ref.1 had the tread pattern shown in FIG. 1 and the same structure except for the sipes on the ribs 6. In Ex.1, the sipes were the first and second sipes shown in FIGS. 2A and 2B. In Ref.1, however, all the sipes were another sipe shown in FIG. 5A.

Ex.2 and Ref.2 had the tread pattern shown in FIG. 3 and the same structure except for the sipes on the ribs 6. In Ex.2, the sipes were the first and second sipes shown in FIGS. 4A and 4B. In Ref.2, however, all the sipes were a sipe shown in FIG. 5B.

1) Uneven Wear Resistance Test

Using a test drum having a surface simulating a dry paved road surface, the test tire was run for 1000 km and uneven wear was measured thereafter. The reciprocal of the amount of uneven wear is indicated by an index based on Ref.1 and Ref.2 being 100. The larger the index, the higher the wear resistance.

2) Ice Performance Test

A 1800 cc FF passenger car provided on all the four wheels with test tires was run on an ice road at a constant speed of 40 km/hr, and a wheel-lock brake was applied to the four wheels to measure the braking distance to stop. (inner pressure 180 kpa, temperature 0 deg.C.) The reciprocal of the braking distance is indicated in Table 1 by an index based on Ref.1 and Ref.2 being 100. The larger the index, the better the ice performance.

3) Snow Performance Test

The above-mentioned test car was run on a road covered with snow trodden hard (snow depth 30 mm, temperature 0 deg.C.), and straight running stability and cornering performance were evaluated into ten ranks by the test driver. The larger the rank number, the better the snow performance.

TABLE 1

Figure 2A:
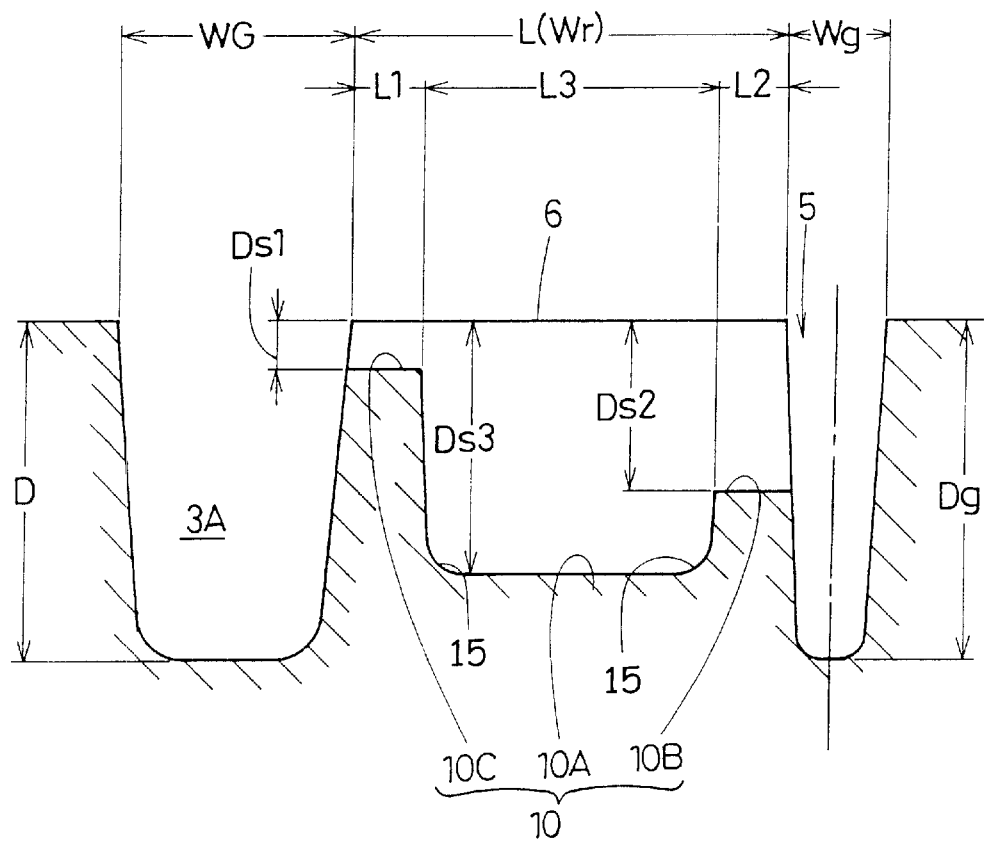
FIGS. 2A and 2B are enlarged cross sectional views taken along a first sipe and a second sipe, respectively.
Figure 2B:
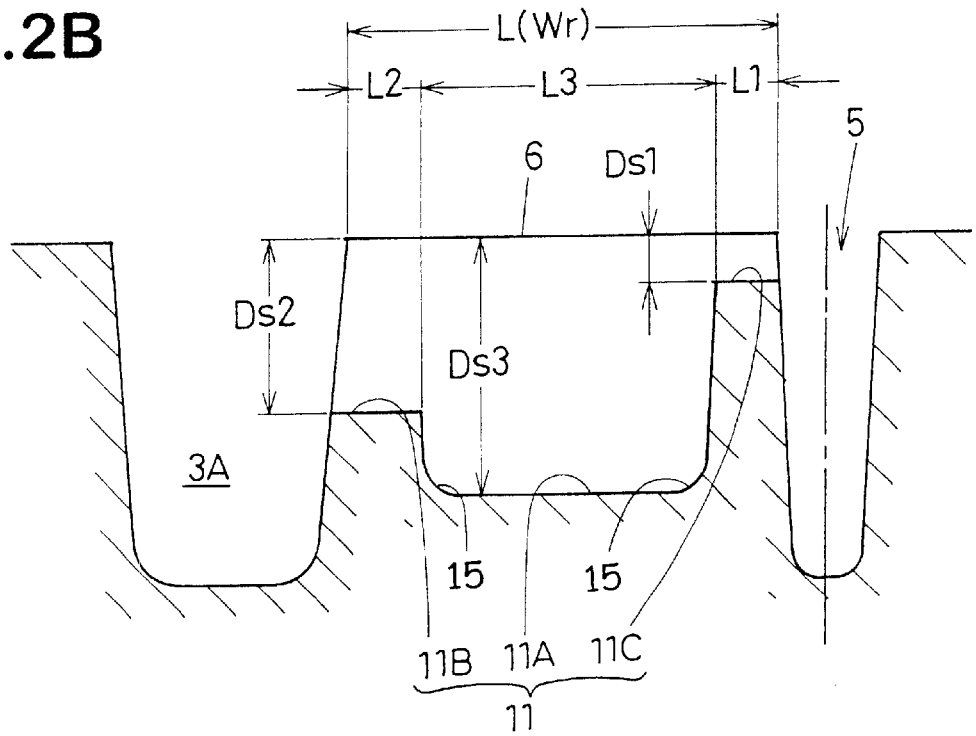
Figure 5A:
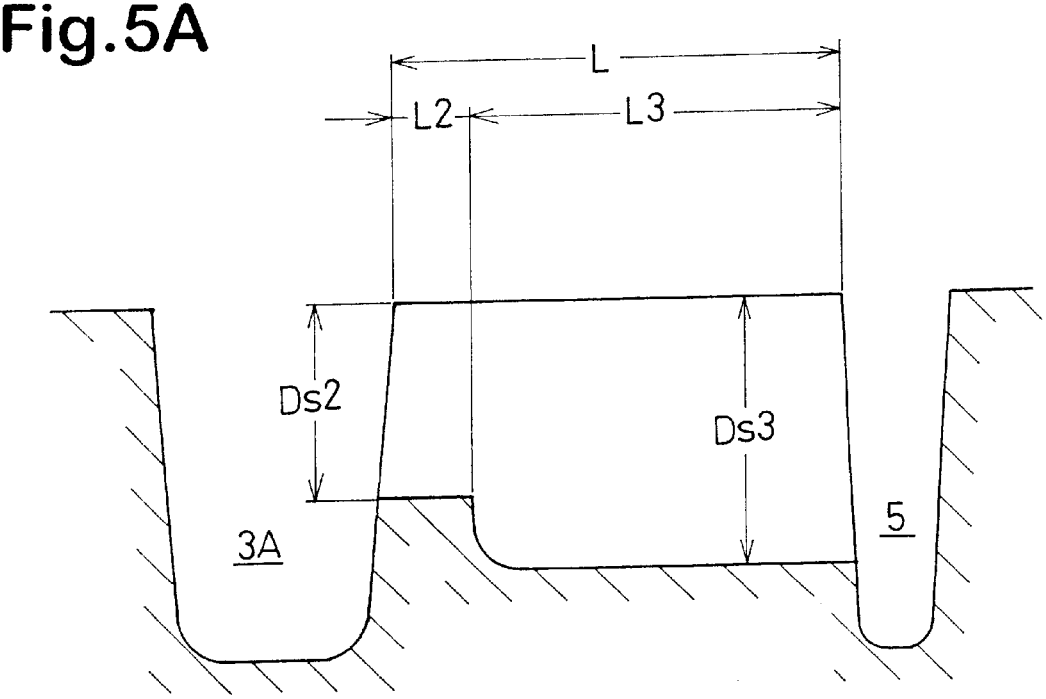
FIGS. 5A and 5B are enlarged cross sectional views taken along sipes used in a comparison test as Ref.1 and Ref.2.
Figure 5B:
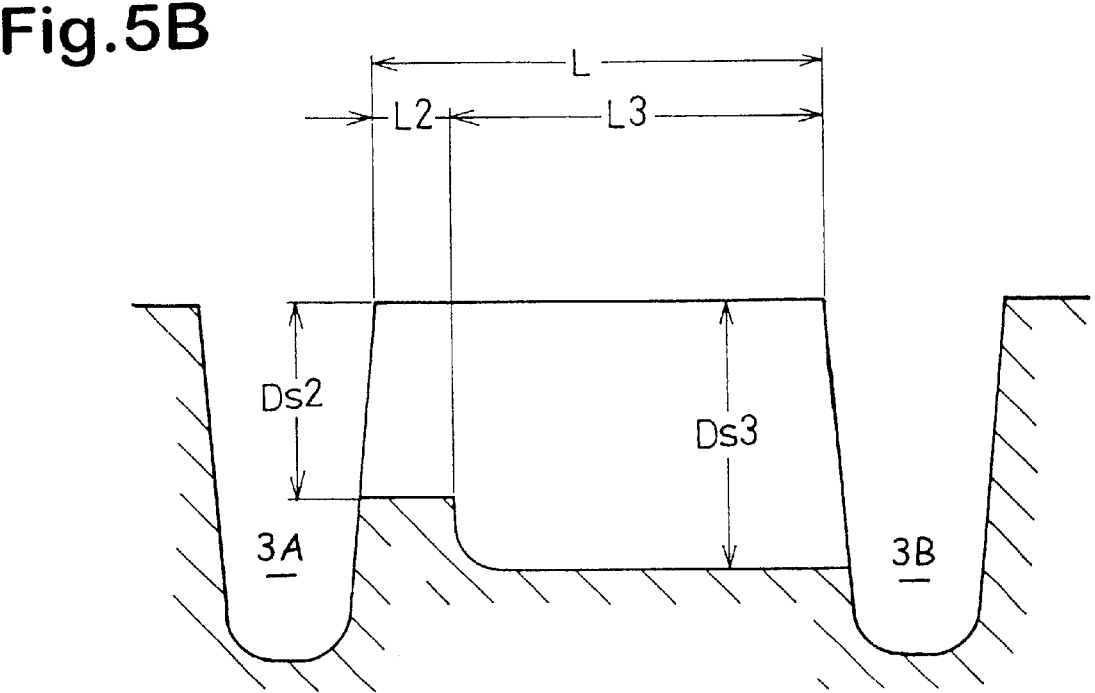
Figure 6A:
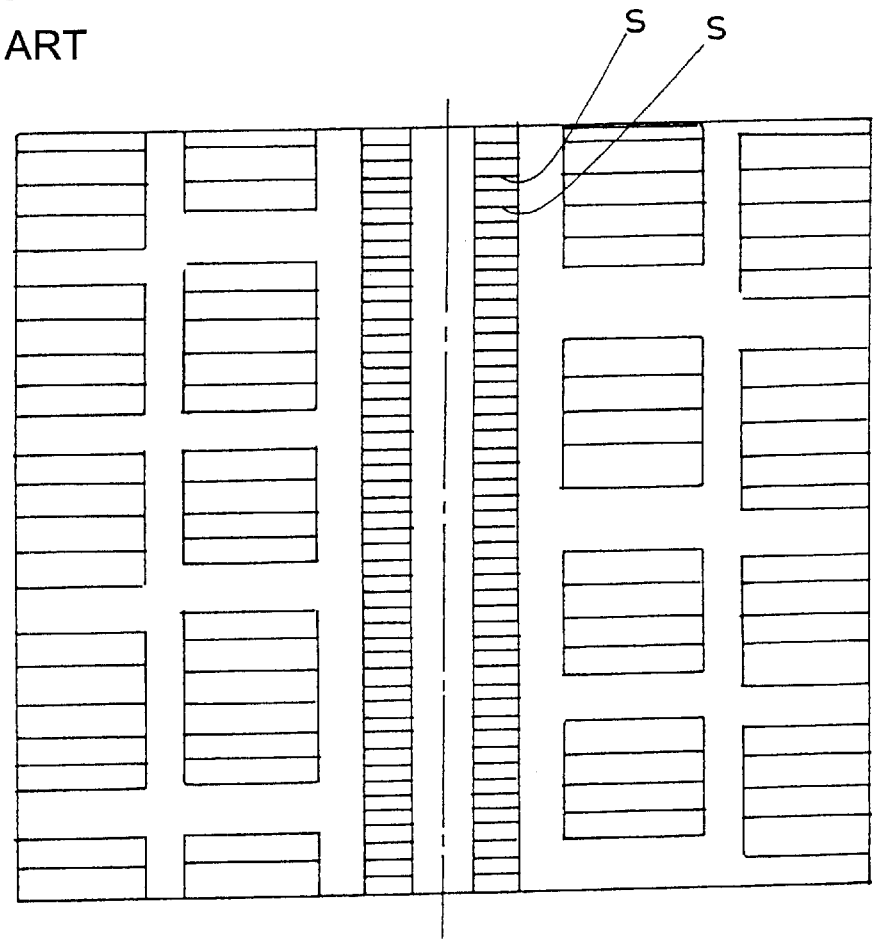
FIGS. 6A and 6B and FIGS. 7A and 7B are diagrams for explaining uneven wear occurring on blocks adjacent to a circumferential rib with conventional sipes.
Figure 6B:
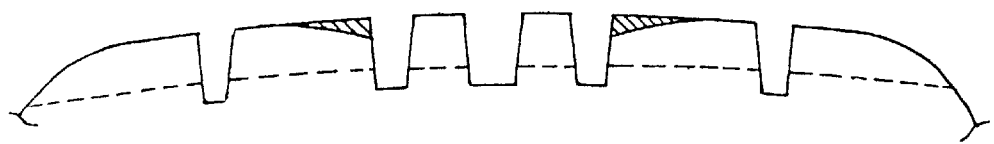
Figure 7A:
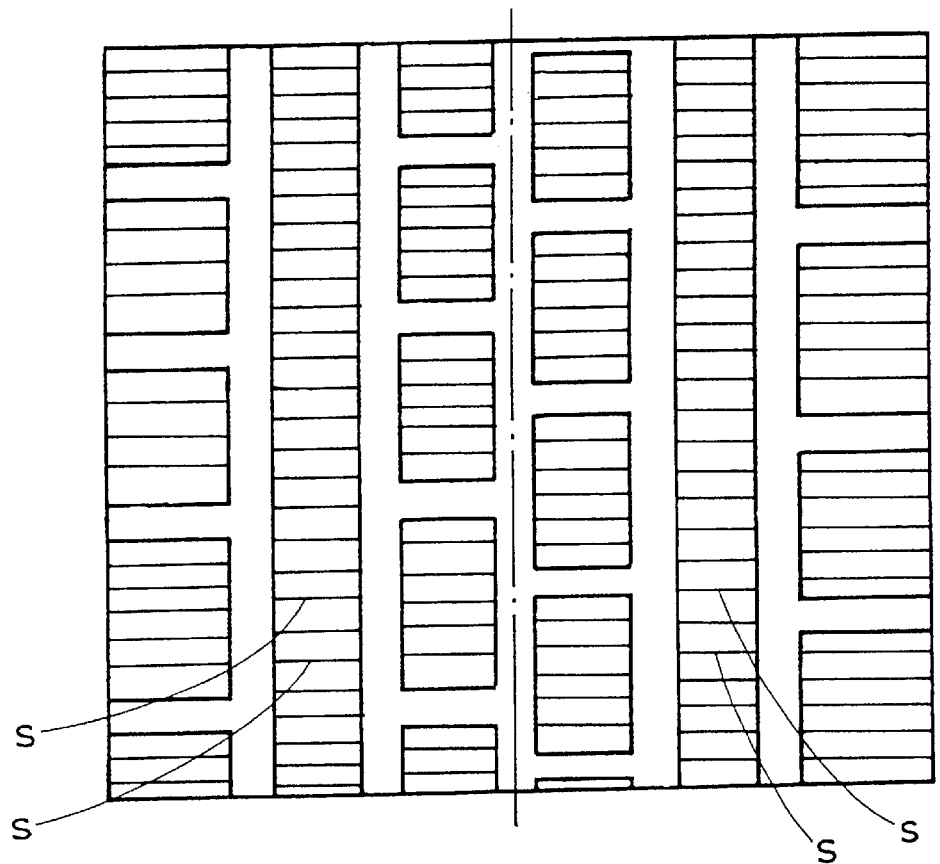
Figure 7B:

| Tire | Ex. 1 | Ref. 1 | Ex. 2 | Ref. 2 |
| --- | --- | --- | --- | --- |
| Tread pattern | Fig. 1 | Fig. 1 | Fig. 3 | Fig. 3 |
| Ground contacting width W (mm) | 152 | 152 | 152 | 152 |
| Sipe | Figs. 2A & 2B | Fig. 5A | Figs. 4A & 4B | Fig. 5B |
| Width (mm) | 0.3 | 0.3 | 0.3 | 0.3 |
| Pitch Pc | 0.031 W | 0.027 W | 0.031 W | 0.027 W |
| Deep part | | | | |
| Depth Ds3 | 0.75 D | 0.75 D | 0.75 D | 0.75 D |
| Length L3 | 0.7 L | 0.81 L | 0.7 L | 0.81 L |
| Mid-depth part | | | | |
| Depth Ds2 | 0.5 D | 0.5 D | 0.5 D | 0.5 D |
| Length L2 | 0.15 L | 0.19 L | 0.15 L | 0.19 L |
| Shallow part | | | | |
| Depth Ds1 | 0.083 D | — | 0.083 D | — |
| Length L1 | 0.15 L | — | 0.15 L | — |
| Rib width Wr | (0.076–0.093) W | (0.062–0.078) W | (0.076–0.093) W | (0.062–0.078) W |
| Main longitudinal groove | | | | |
| Depth D (mm) | 12 | 12 | 12 | 12 |
| Central narrow longitudinal groove | | | | |
| Depth Dg | 0.75 D | 0.75 D | | |
| Width Wg | 0.028 W | 0.028 W | | |
| Uneven wear resistance | 100 | 50 | 100 | 50 |
| Ice performance | 115 | 100 | 115 | 100 |
| Snow performance | 6 | 6 | 6 | 6 |

It was confirmed from the test results that, in the studless tires according to the present invention, uneven wear and ice performance can be effectively improved while maintaining the snow performance.

What is claimed is:

1. A studless tire comprising a tread provided with a plurality of blocks and at least one rib provided with first sipes and second sipes each extending thereacross, said at least one rib crossed only by said first sipes and second sipes, the first sipes and second sipes alternately arranged in the longitudinal direction of the rib at circumferential pitches Pc in a range of from 0.028 to 0.04 times a ground contacting width of the tread, each of the first sipes and second sipes comprising a deep central part, a shallow part on one side thereof and a mid-depth part on the other side thereof, the deep central part having a depth in a range of from 0.70 to 0.80 times a depth of a main longitudinal groove defining the rib, the mid-depth part having a depth being in a range of from 0.40 to 0.60 times the depth of the main longitudinal groove, and the shallow part having a depth in a range of from 0.04 to 0.35 times the depth of the main longitudinal groove, the shallow part and mid-depth part of each first sipe being positionally reverse to those of the second sipes so that, on each side of the rib, each shallow part alternating with an adjacent mid-depth part.

2. The studless tire according to claim 1, wherein the axial length of the deep central part is in a range of from 0.40 to 0.9 times the axial length of the sipe, the axial length of the mid-depth part is in a range of from 0.05 to 0.3 times the axial length of the sipe, and the axial length of the shallow part is in a range of from 0.05 to 0.3 times the axial length of the sipe.

3. The studless tire according to claim 2, wherein said at least one rib has an axially inner straight edge and an axially outer zigzag edge, and the zigzag of the axially outer zigzag edge comprises long segments and very short segments.

4. The studless tire according to claim 2, wherein the axial width of said at least one rib is in a range of from 0.07 to 0.30 times the ground contacting width.

5. The studless tire according to claim 1, wherein said at least one rib has an axially inner straight edge and an axially outer zigzag edge, and the zigzag of the axially outer zigzag edge comprises long segments and very short segments.

6. The studless tire according to claim 5, wherein the axial width of said at least one rib is in a range of from 0.07 to 0.30 times the ground contacting width.

7. The studless tire according to claim 1, wherein the axial width of said at least one rib is in a range of from 0.07 to 0.30 times the ground contacting width.

8. The studless tire according to claim 1, wherein said at least one rib is a rib disposed on each side of the tire equator, and some of said blocks are arranged in one circumferential row on the axially outside of each of the ribs, and the remainder are arranged in at least one circumferential row between the ribs.

9. The studless tire according to claim 1, wherein said at least one rib is a rib disposed on each side of the tire equator, and said blocks are arranged in two circumferential rows on the axially outside of each of the ribs.

10. The studless tire according to claim 9, wherein said tread is provided between the ribs with a narrow longitudinal groove having an axial width of from 0.02 to 0.06 times the ground contacting width, and the axial width of said at least one rib is in a range of from 0.07 to 0.30 times the ground contacting width.

11. The studless tire according to claim 1, wherein each of the first sipes and second sipes is substantially straight.

12. The studless tire according to claim 1, wherein each of the first sipes and second sipes is substantially straight and substantially parallel to the tire axial direction.

13. The studless tire according to claim 1, wherein each of the first sipes and second sipes is zigzag.

14. The studless tire according to claim 1, wherein each of the first sipes and second sipes is zigzag, and both end portions thereof are parallel to the tire axial direction.

15. The studless tire according to claim 1, wherein the deep central part is zigzag, but the shallow part and mid-depth part are straight.

\* \* \* \* \*